R. J. COLVIN.
Improvement in Combined Harrow, Roller and Seed Planters.
No. 115,026. Patented May 23, 1871.
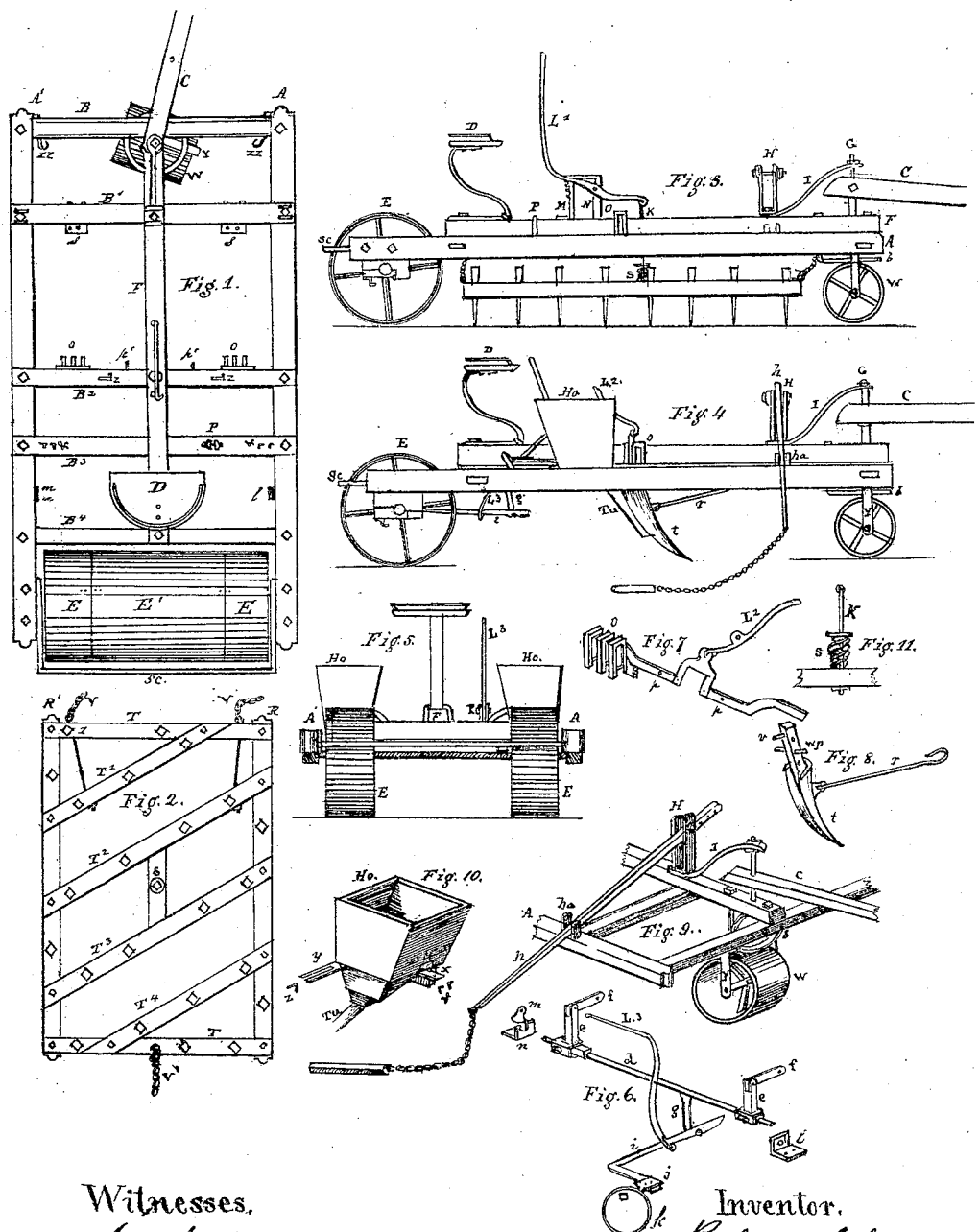

UNITED STATES PATENT OFFICE.

ROBERT J. COLVIN, OF LANCASTER, PENNSYLVANIA.

IMPROVEMENT IN COMBINED HARROW, ROLLER, AND SEED-PLANTER.

Specification forming part of Letters Patent No. 115,026, dated May 23, 1871.

I, ROBERT J. COLVIN, of the city of Lancaster, in the State of Pennsylvania, have invented certain Improvements in the Combination of Harrow, Roller, and Two-Row Seed-Planter, of which the following is a specification:

The object of my invention is to improve this class of combinations for finishing in one operation the work of harrowing and rolling, and relieve the person from the jerking and drudgery subjected to in following the harrow, and to obviate the necessity of loading the harrow with a weight, which it is often necessary to remove in order to clean the teeth of the harrow. All this is performed while comfortably seated on the machine, with a lever at hand, by which he can not only raise the harrow with ease clear from the ground or stubble, but also put any amount of pressure upon the harrow and lock it, if necessary, to continue the pressure.

The roller is composed of two side sections to constitute the carriage-wheels; united with the central section they form a continuous roller. The harrow is readily unshipped, and the hopper, shovels, and appliance put in place, and converts the machine into a superior two-row seeder. The harrow is well adapted for use independently. Thus I can roll and harrow, roll without harrowing, harrow without rolling, and plant two rows of corn, &c., with the same machine. Thereby space in housing is economized, as well as expense in these separate machines equally efficient.

Figure 1 shows the frame-work with its parts and the combined sectional roller D E' E in place, as when used for rolling without harrowing. Fig. 2 shows the frame-work and teeth of the harrow, from 1 to 24, detached, and may so be used. Fig. 3 shows a side elevation of frame, Fig. 1, with the harrow attached. When for rolling, the central section remains; to harrow only, the central section of the roller is removed. Fig. 4 shows a side elevation with the harrow removed, and the hoppers, shovels, and other appliances in place to constitute the seeding or corn-planting machines. Fig. 5 is a rear elevation with the central section of the roller removed, showing the wheels and two hoppers, &c.; Fig. 6, a perspective view of the rocker-shaft, shifting arms, eccentric, and lever, for shifting and unshifting the action of the seed-valves or slides; Fig. 7, the double-yoke lever to raise the shovels, with the adjusting slotted standards, &c. Fig. 8 shows the shovel with its hoisting-pin $v$ and wooden pin $w$ $p$ for the slots in the standard. Fig. 9 illustrates the front wheel, fifth-wheel-like appliance, tongue, swivel, marker, support, &c. Fig. 10 shows a hopper, with the mode for adjusting shown. Fig. 11 shows the jointed spring rod, spiral spring, and parts of the central piece of the harrow.

A brief description of the construction and operation of the combinations shown in the drawing, with the letters of reference, will enable any one skilled in the art to make and use the same.

To combine the harrow, Fig. 1, with the frame of the machine, Fig. 1, under which it is made to fit, so that the jointed spring-rod K in the center of the harrow, marked S, comes up through a hole in the center beam F, and is united by a pin with the lever $L^1$, the front chains V, on their long bolts U in the front of the harrow, are connected to the hook Z Z Z Z, shown in the front corners of the machine. A similar hook is on the rear cross-piece $B^4$ for the central chain V' on the harrow. This constitutes the harrow combination with the roller. For harrowing without rolling, the central section E' is removed, which is readily performed by means of the hinged boxes and handled screw-nut, and removing the outer section E, which fits up against a shoulder on the axle and confines the inner, which is now readily drawn out, having a central pipe or sleeve which fits over the axle. By replacing the outer section, E and E, remaining, now form ordinary broad wheels, as shown in Fig. 5. The harrow, with its diagonal parallel cross-pieces $T^1$, $T^2$, $T^3$, and $T^4$, and end and side frames R' R T, is provided with twenty-four teeth, as shown and numbered. These are so arranged as to score regularly apart, and yet will not come in contact with the upper frame-work, but fit closely under it when drawn up by the lever, and held in the notched rack-bar M and the supporting-post N. This lever $L^1$, by its connection with the rod K, has a hook-joint below to allow of a vibratory motion in the harrow, with an eyed bolt that passes centrally through the piece that connects T² with T³. This joint and rod K is surrounded by a spiral spring, S, and check-plate; and by the use of the lever the harrow can be pressed down and held under that pressure. By locking the lever in the rack-notch to disengage the lever, the spring will relieve the pressure at once.

The farmer, comfortably seated on the machine on the spring-seat D, with the lever convenient to his hand, has full control of the harrow for raising up, shaking off stubble, pressure, hoisting, and lowering with perfect ease.

The roller is cleaned by a cross-piece, s c, on the rear, bolted to the side beams A′ A. This need not be removed for removing the roller E′, but remains in for whatever purpose the machine is used. Thus a simple and efficient roller is had—a harrow with or without the roller, as the circumstances may demand. To make the upper frame available for a two-row corn-planter it is only necessary to remove the lever-arm L¹, and the harrow is readily unhooked; and if not already removed, the central portion E′ of the roller is removed and the eccentric k slipped upon the axle and under the rim of the right-hand wheel E. This eccentric has a hinged arm, j, elbowed at i, which slips through a loop on the end of the lever-arm L³. This lever is held in the slotted upright P, on the cross-piece B³, by a bolt as its fulcrum. The arm i from the eccentric has a notch which embraces a pin on a bar, g, connected with the rocking-shaft d. This rocking-shaft has one end inserted in a hole or bearing in the plate l on the side beam A; the other end is then dropped into an open bearing in the piece n, when the turn-plate m over it is turned down to confine it, as seen, on the inside of beam A′, between the cross-pieces B³ and B⁴. The combined arrangement is shown by Fig. 6. The uprights e e, with their hinged connecting-arms f f, have a sleeve-like base, by which they can be adjusted on the rocker-shaft d and secured by set-screws, the arms f f being connected with the slides in the hoppers, and operate the action of the valves. To unshift it is only necessary to raise the arm i by the lever L³, so that the pin on g of the rock-shaft becomes disengaged from the notch in the arm i, by which, when connected, the motion from the eccentric is imparted. To affix the hoppers H o, in Fig. 10 is shown a long open slot in a strap, y, at one corner, and a turning clamp-hook, z, as seen on the cross-piece B², in which long slot the adjustment is made and held. Under the slides is shown a perforated plate, x. This perforation is secured to either of the one-sided bolt-heads, marked &, according to the desired adjustment. These hook-bolts are shown at & on the cross-piece B³. The shovel-heads u, Fig. 8, are provided with a series of holes for a stout wooden pin, w p. This pin extends into the slots in the upright pieces O, shown on the forward side of the cross-piece B² and on one end of the hinged yoke-lever, Fig. 7. The ends of this lever enter behind the uprights O and rest on a bar. The top of the shovel-head has also a metallic pin, v, which rests upon the end of said lever p, which lever is perforated on each wing to set on a fulcrum-pin, p′, shown also on the cross-piece B². The two ends are hinged to a central yoke which straddles the central beam F, and is connected above with a lever, L², attached in like manner as lever L¹, removed. Thus both the shovels can be raised from the ground at once or let down at pleasure, and kept up, while going to or from the field, by the notched rack M. The shovel-rods r, with their hook ends, are adjusted in the perforated plates S, bolted on the cross-piece B¹. Thus it will be seen that the slides, hoppers, and shovels can all be adjusted to act in perfect unison, and fully adapted to the class or distance elected to separate the rows. To graduate the distance, an adjustable marking-rod, h, with a chain and drag-weight, is provided. This rod is held between the two uprights H, bolted down with the brace-piece I under it, and upon which it also turns, so that the rod, also adjusted by the bolt and a series of perforations for it, can be turned to either side of the machine at pleasure. To hold the marking-rod in place it is lodged between a pair of uprights, h a, on the outer ends of the cross-piece B¹.

I am aware that I employ substantially the same device in operating the slides and valves as in my patent No. 7,680, October, 1850, on a single-row planter, but arranged differently, in combination with my adjustments. I am also aware that combined harrows and rollers are not new, nor seeders and rollers; that numerous devices are patented on combinations; but I am not aware of any combination or arrangement substantially like those herein specified and shown.

What I claim as my invention, and desire to secure by Letters Patent, is—

1. In a combined harrow, roller, and two-row seed-planter, the arrangement of the frame A A′ B B¹ B² B³ B⁴, with its device M N, lever L, hooks Z Z to adapt it for the attachment of a harrow, R′ T, with its spring S, connecting-rod K, and chains V, as also for the application of the sectional roller E E′ E, forming a combined harrow and roller, substantially in the manner shown, for the purpose specified.

2. In combination with the frame A A′ B B¹ B² B³ B⁴, with its devices S O p′ P and l m n H, its adaptation for the hopper h o, shovels t, yoke p, and seeding devices d e f, in combination with the outer sections E of said roller, operating in the manner and for the purpose set forth.

ROBERT J. COLVIN.

Witnesses:
JNO. M. AMWEG,
EDWIN EBERMAN.